United States Patent [19]

Stone et al.

[11] 4,395,001
[45] Jul. 26, 1983

[54] ATTITUDE SELECTIVE AIRCREW ESCAPE CONTROL

[75] Inventors: W. James Stone; Vernon D. Burklund; Robert B. Dillinger, all of Ridgecrest, Calif.

[73] Assignee: The United States of America as represented by the Secretary of the Navy, Washington, D.C.

[21] Appl. No.: 890,099

[22] Filed: Mar. 27, 1978

[51] Int. Cl.³ .............................................. B64D 25/10
[52] U.S. Cl. ...................... 244/122 AE; 244/122 AB; 244/141
[58] Field of Search ................. 244/122 AD, 122 AB, 244/122 A, 122 AC, 122 AE, 122 AH, 141

[56] References Cited

U.S. PATENT DOCUMENTS

| | | | |
|---|---|---|---|
| 3,190,589 | 6/1965 | Mennborg | 244/122 AB |
| 3,442,473 | 5/1969 | Rivedal | 244/122 AB |
| 3,592,419 | 7/1971 | Hantzsch | 244/122 AD |
| 3,701,502 | 10/1972 | Martin | 244/122 AD |
| 3,740,005 | 6/1973 | Rivers | 244/122 AD |
| 3,802,651 | 4/1974 | Axenborg | 244/122 AD |
| 3,861,625 | 1/1975 | Sadler | 244/122 AD |
| 3,862,731 | 1/1975 | McIntyre | 244/141 |
| 3,885,452 | 5/1975 | Weinstock | 244/122 AB |
| 3,912,203 | 10/1975 | De Stefano | 244/122 AD |
| 4,036,456 | 7/1977 | Skinner | 244/122 AD |

*Primary Examiner*—Galen L. Barefoot
*Attorney, Agent, or Firm*—R. F. Beers; W. T. Skeer

[57] ABSTRACT

A line cutter or discharge valve responsive to aircraft attitude is positioned on an aircraft ejection seat to interrupt the gas initiated sustainer rocket system. During inverted ejections, the cutter or valve will either sever or discharge pressure from a tube which leads from the firing squib to the sustainer rocket. Preventing sustainer rocket ignition enhances inverted ejection survivability by reducing crew member velocity toward the ground, thereby lengthening the time available for parachute deployment.

8 Claims, 6 Drawing Figures

| INPUT | | | | | OUTPUT | | |
|---|---|---|---|---|---|---|---|
| PITCH ANGLE | ROLL ANGLE | SEAT MOTION | 400~ POWER | 28 VDC POWER | RELAY SAFE | RELAY ARM | SQUIB CURRENT |
| 0 | 0 | NO | UP | UP | YES | — | 0 |
| +75° OR -105° | X | NO | UP | UP | — | YES | 0 |
| 0 | > ±90° | NO | UP | UP | YES | YES | 0 |
| 0 | 0 | YES | UP | UP | YES | — | 0 |
| X | X | NO | FAILS | UP | YES | PREVENTED | 0 |
| X | X | NO | UP | FAILS | — | PREVENTED | 0 |
| +75° OR -105° | X | YES | UP | UP | — | YES | 10 AMPS |
| X | > ±90° | YES | UP | UP | — | YES | 10 AMPS |

X = ANY VALUE

0 < +75° OR -105° PITCH

0 < ±90° ROLL

ATTITUDE SELECTIVE AIRCREW ESCAPE CONTROL

BACKGROUND OF THE INVENTION

The present invention is concerned with crew member survivability in a disabled aircraft. Usually when an aircraft is disabled, the crew member or crew members are ejected therefrom by some type of an escape system. One type uses a catapult to boost the seat mechanism through the canopy on a rail; and as the seat mechanism clears the rail, a sustainer rocket is ignited and lifts the crew member or members to a safe height clear of the aircraft, at which time a parachute is deployed to lower the crew member or members safely to the ground.

One shortcoming of such a system is that if the aircraft pitches or rolls to such a point that the crew member will be projected toward the ground upon ejection, instead of enhancing survivability, the odds are that the crew member or members will be severely injured, if not killed.

SUMMARY OF THE INVENTION

The present invention is directed to a dual mode escape system which utilizes an add-on to the rocket motor firing body to selectively disable the sustainer rocket on the ejection seat. Part of the add-on is a logic matrix (not mounted on the firing body) which receives pitch and roll signals from aircraft avionics and, which through the logic, determines whether an arm or safe signal is outputted to a latching relay. The latching relay is connected between a seat power source and a seat motion detector switch which is coupled to a squib which initiates a pin-pulling device.

The pin-pulling device severs the connection between the sustainer rocket firing squib and the sustainer rocket by severing the pressure hose connection which leads to the sustainer igniter. When aircraft attitude exceeds predetermined limits on pitch and roll, an arm signal activates the latching relay which couples the seat power source to the pin puller squib if seat motion has been detected. Seat motion will be detected if the catapult has been initiated in the first sequence of the ejection.

BRIEF DESCRIPTION OF THE DRAWINGS

FIG. 6 is a logic matrix of the decision modes of the escape system electronics of FIG. 5.

DESCRIPTION OF THE PREFERRED EMBODIMENT

Figure 1:
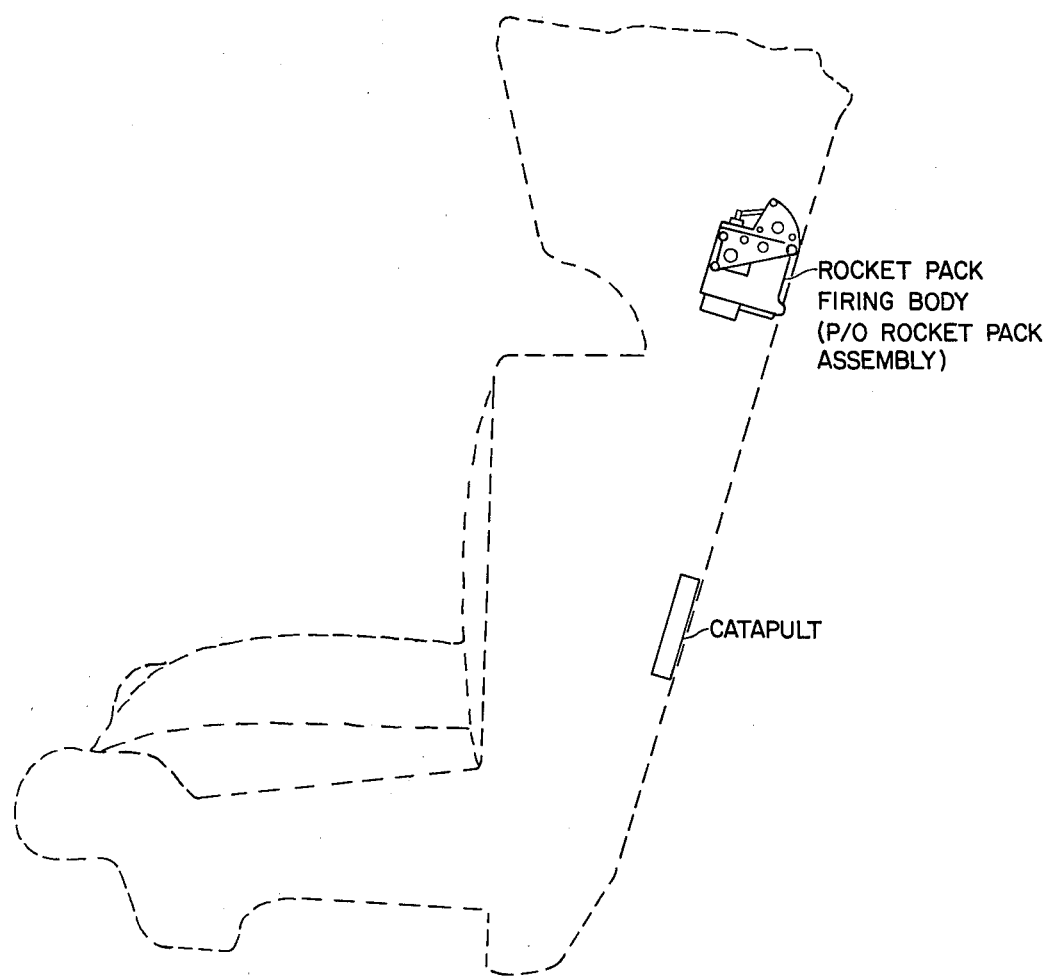
FIG. 1 is an overall outline view of an ejection seat used with a catapult and sustainer rocket.

FIG. 1 is an outline view of an ejection seat, GRU-7A/1, which incorporates the rocket pack firing body. The ejection seat shown in FIG. 1 utilizes a catapult and sustainer rocket. In normal operation, the catapult is initiated, which drives the ejection seat upwardly on a rail; and after a predetermined time, the sustainer rocket is initiated to boost the seat with the crew member in it to a safe height for parachute opening.

Figure 2:
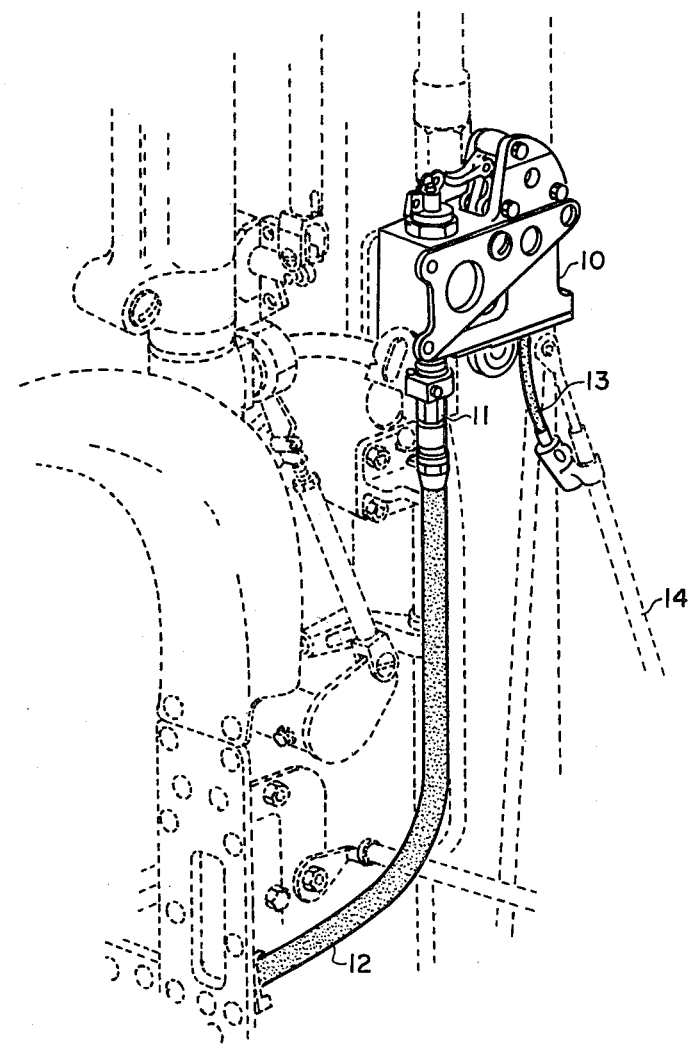
FIG. 2 illustrates the seat ejection rocket motor and gas fired dispenser installation on the ejection seat encircled in FIG. 1.

FIG. 2 shows the seat ejection rocket motor and gas fired dispenser installation on a larger scale. Rocket motor firing body 10 is mounted on the seat and a connector 11 connects pressure hose 12 to the sustainer rocket which is not shown. A lanyard 13, shown having one end is connected to a mechanism on the rocket firing body 10 and having the other end connected to a rod 14 which is fixed to the aircraft cockpit interior.

Figure 3:
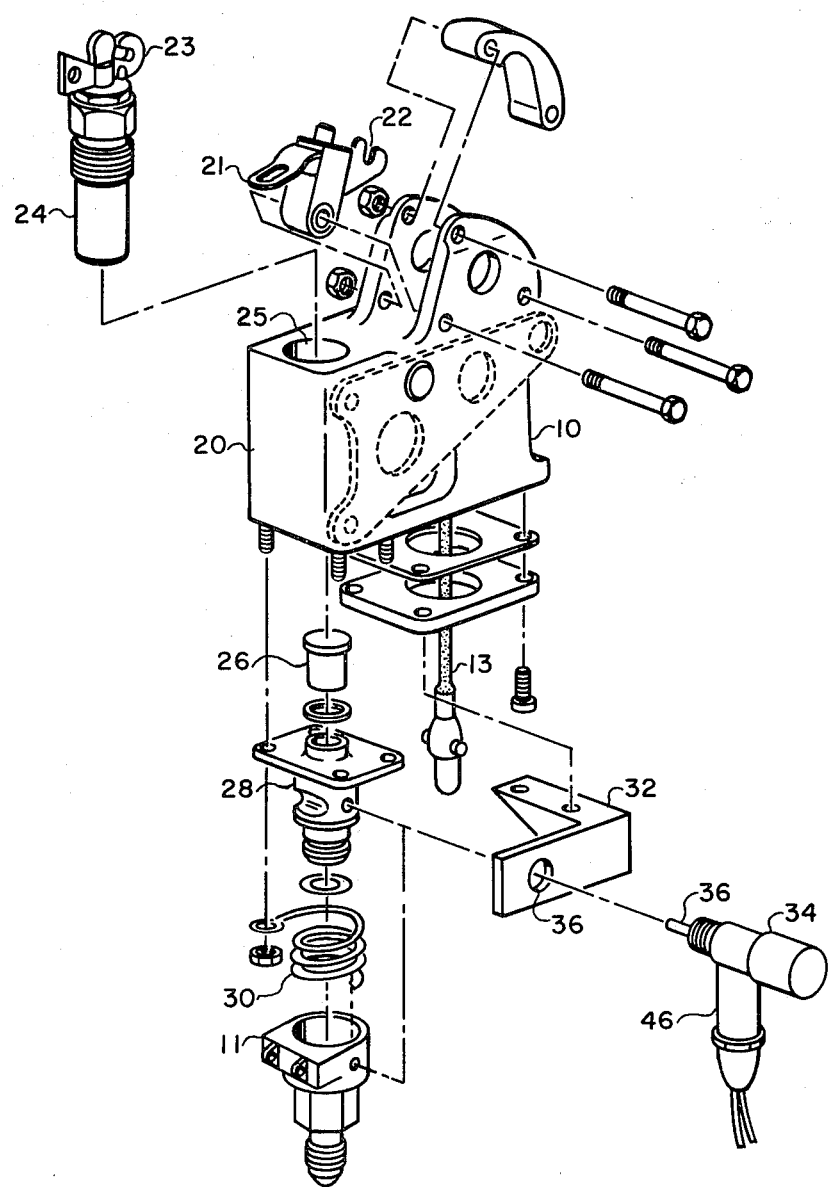
FIG. 3 is an assembly view of the seat ejection rocket motor and gas fired dispenser installation.

An exploded view of the seat ejection rocket motor and gas fired dispenser is shown in FIG. 3. The rocket motor firing body 10 carries a body subassembly 20 which in turn carries a lever subassembly 21 to which lanyard 13 attaches at notch 22. The lever subassembly 21 interacts with sear 23 which is carried on a firing pin assembly 24. The firing pin assembly fits in a bore 25 which extends through body subassembly 20.

Firing pin assembly 24 is in communication with a pressure cartridge 26 which fits in connector 28 which in turn is bolted to body subassembly 20. Connector 28 is carried internally of the pressure hose connector 11 and is spring biased with respect thereto by an ejection spring 30.

A mount 32 is attached to the body subassembly 20 and a pin puller 34 is threadedly secured thereto in female fitting 36. The pin puller 34 secures connector 28 to pressure hose connector 11 by means of a pin 36. The various bolts, nuts, O-rings, and other items which are not essential to the operation of the device and are readily apparent from the exploded view are not explained or set forth in detail.

Figure 4:
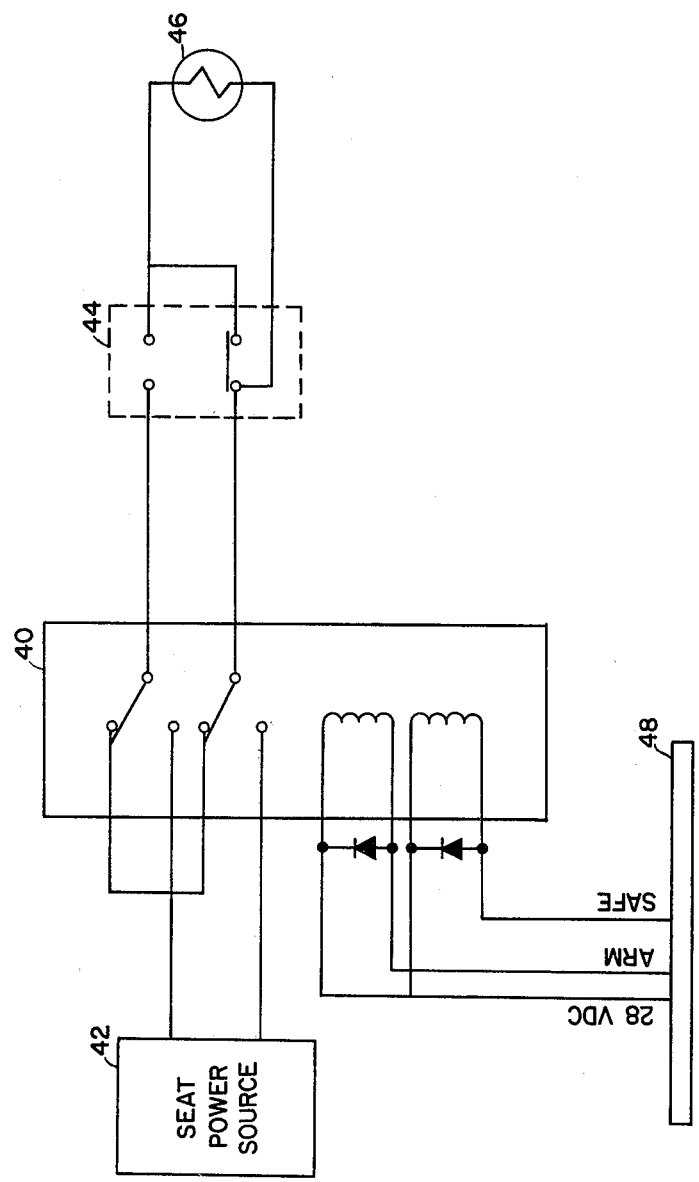
FIG. 4 is a block diagram schematic of the rocket motor interrupter system.

The rocket motor interrupter is set forth in FIG. 4 wherein a latching relay 40, seat power source 42, seat motion detector switch 44, and squib 46 are shown electrically interconnected. Squib 46 is carried in pin puller 34. The seat motion detector switch 44, a double break microswitch, detects motion of the seat caused by the catapult relative to a fixed portion of the aircraft. Umbilical connector 48 connects the interrupter system to the escape system electronics which are shown in FIG. 5.

Figure 5:
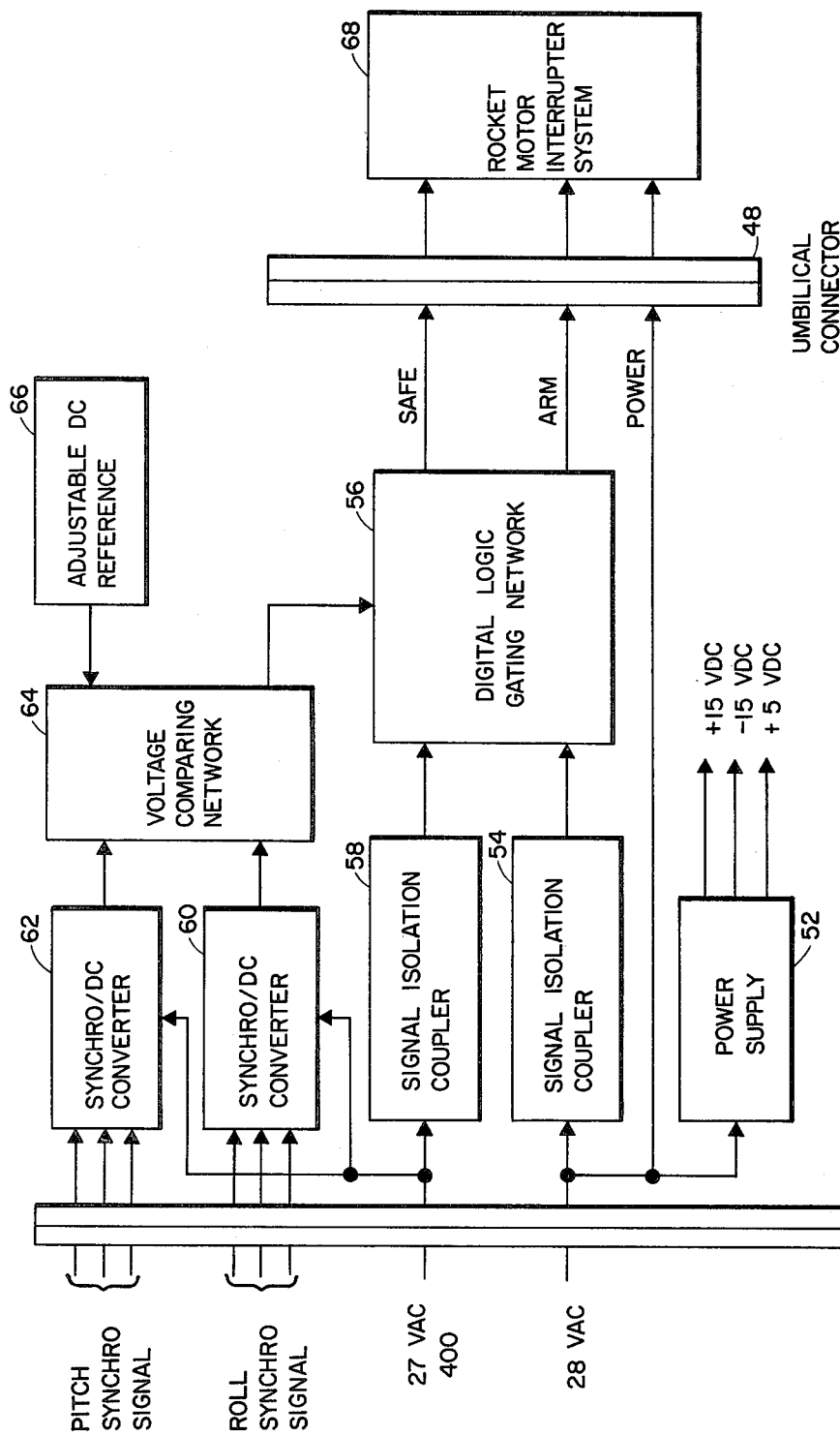
FIG. 5 is a functional block diagram of the dual mode escape system electronics.

The escape system electronics section shown in FIG. 5 is connected to the aircraft avionics and power through a connector 50. 28 VDC is connected as the input to a power supply 52 which outputs ±15 VDC and +5 VDC. The 28 VDC is also connected through umbilical connector 48 to the rocket motor interrupter system 68 and as the input to a signal isolation coupler 54.

The output of coupler 54 is coupled as one input to a digital logic gating network 56 which has as outputs therefrom SAFE and ARM signals.

27 VAC, 400 cycle power from the aircraft (or 115 VAC, 400 cycle) is also coupled through connection 50 as an input to another signal isolation coupler 58, and as an input to synchro-to-DC converter 60 and synchro-to-DC converter 62.

Roll synchro signals and pitch synchro signals are coupled through connection 50 to the synchro-to-DC converters 60 and 62 respectively. The synchros provide outputs which are coupled as inputs to a voltage comparing network 64. Reference signals are also inputted to the network 64 from an adjustable DC reference 66.

Voltage comparing network 64 provides an output which is coupled as another input to digital logic gating network 56 which also receives, as another input, the output of signal isolation coupler 58.

The SAFE and ARM signals from the gating network are coupled to the rocket motor interrupter via the umbilical connector 48. The SAFE command is normally up; however, when aircraft attitude exceeds some specified limits, an ARM command appears and the SAFE command disappears.

Couplers 54 and 58 are used to sense the 28 VDC and 27 VAC signal levels, respectively; and if they fall below a minimum level, the gating network commands a SAFE condition regardless of aircraft attitude.

In operation, the electronics section of FIG. 5 monitors pitch and roll signals from gyros in either the aircraft's navigation or fire control systems. The pitch and roll signals are converted to DC signals and compared against reference signals in network 64. When the pitch and/or roll signals reach a predetermined level, the latching relay 40 in the interrupter system is tripped, thereby arming the system.

FIG. 6 is a logic matrix illustrating inputs and outputs to the escape electronics section of FIG. 5.

The electronics section outputs a SAFE command in the event of an aircraft power failure.

The unit can be adjusted for different pitch and roll tripping points by varying adjustable DC reference 66. In the present configuration, the system is armed when the aircraft attitude exceeds 90° roll either counter clockwise or clockwise, 105° nose below the horizontal pitch or 75° nose above the horizontal pitch.

The electronics unit of FIG. 5 is located in the aircraft and interfaces with the interrupter system through an umbilical connection 48 on the ejection seat.

The interruption system of FIG. 4 is mounted entirely on the ejection seat and consists of the seat power source 42, seat motion detector switch 44, latching relay 40, and explosive squib 46. The seat power can either be a storage battery or a thermal battery. The present configuration utilizes a thermal battery with a mechanical firing pin.

The interrupter system has two modes of operation; i.e. system armed or system safed. An ejection with the system armed would proceed as follows: initiation of seat movement causes separation of the umbilical connection 48 and closure of the seat motion detector switch 44 and activation of the thermal battery. With the latching relay armed, squib 46 will fire when the thermal battery reaches a sufficient level. Normal rise time for the thermal battery is 25 milliseconds. When squib 46 is fired, pin puller 34 is activated, thereby withdrawing pin 36, which allows pressure hose 12 to be released from the firing body 10 by spring 30 and acceleration forces imparted by the rising seat.

The foregoing sequence is completed before the ejection seat reaches the top of the catapult rail.

Cartridge 26, which pressurizes the flexible hose 12 and fires the igniter for the rocket sustainer motor, is fired through action of lanyard 13 acting on sear 23 which cocks and releases the firing pin assembly 24 to cause pressure cartridge 26 to ignite. Cartridge 26 is fired when the seat leaves the top of the catapult. With flexible hose 12 separated from firing body 10, pressure cartridge 26 will be fired but the rocket motor will not be ignited.

The sequence for an ejection with the system safed is similar except that during ejection, the thermal battery comprising the seat power source 42 is activated; and the seat motion detector switch 44 is closed. However, with the latching relay 40 in the safe position, squib 46 will not fire. Thus, flexible hose 12 will not separate from the firing body; and normal sustainer rocket motor firing sequence will occur.

Thus, the system senses dangerous limits on ejection to prevent firing of the sustainer rocket when the aircraft is in a hazardous pitch and roll attitude.

Although the system has been described with respect to a means for severing the pressure hose connection which leads to the sustainer ignitor, it is to be understood that the invention pertains to any means for disabling or interrupting the sustainer phase of a boost-sustain system.

What is claimed is:

1. An improved escape system for an aircraft having a catapult-boosted ejection seat, wherein the improvement comprises:
   a seat mechanism mounted in the aircraft and adapted to be ejected therefrom;
   sustainer motor means associated with said seat mechanism for providing ejection movement of said seat mechanism at a predetermined time;
   means for firing said sustainer motor means mounted on said seat mechanism;
   a pressure hose in open communication between said means for firing said sustainer motor means and said sustainer motor means; and
   interrupter means associated with said seat mechanism for selectively preventing action of said sustainer motor means, wherein said interrupter means disconnects said pressure hose from one of said means for firing said sustainer motor means and said sustainer motor means during an ejection occurring when the attitude of the aircraft exceeds predetermined limits on pitch and roll.

2. An improved escape system for an aircraft according to claim 1 wherein said sustainer motor means comprises a rocket motor.

3. An improved escape system for an aircraft according to claim 1 wherein said interrupter means incorporates a seat motion detector switch for detecting motion of said seat mechanism.

4. An improved escape system for an aircraft according to claim 1 further including a logic network connected to said seat mechanism, said logic network configured to receive signals corresponding to pitch and roll of the aircraft, said logic network having an output connected to said sustainer motor means, said output being dependent upon the pitch and roll of said aircraft.

5. An improved escape system for an aircraft according to claim 4 wherein an Arm signal appears at the output of said logic network when the nose of the aircraft is more than 75° above the horizontal or when the nose of the aircraft is more than 105° below the horizontal and the roll angle is any value, or the pitch angle is 0° and the roll angle is greater than 90° clockwise or 90° counter clockwise.

6. An improved escape system for an aircraft according to claim 4 wherein the output of said logic network is an arm signal when the nose of the aircraft is more than 75° above the horizontal or more than 105° below the horizontal and the roll angle is any value and there is seat motion, or when the pitch angle is any value and the roll angle is greater than 90° clockwise or 90° counter clockwise and there is seat motion.

7. An improved escape system for an aircraft according to claim 4 wherein there is an output arm signal from said logic network when the nose of the aircraft is more than 75° above the horizontal or more than 105° below the horizontal and the roll angle is any value; or when the pitch angle is 0° and the roll angle is greater than 90° clockwise or 90° counterclockwise; or when the nose of the aircraft is more than 75° above the horizontal or more than 105° below the horizontal, roll angle is any value and there is seat motion, or when the pitch angle is any value, the roll angle is greater than 90° clockwise or greater than 90° counterclockwise and there is seat motion.

8. An improved escape system for an aircraft according to claim 3 further including:
- a squib in electrical communication with said seat motion detector switch in said interrupt means;
- a seat power source mounted on said seat mechanism;
- a latching relay connected between said seat power source and said seat motion detector switch, said latching relay being energized by the output of said logic network.

* * * * *

UNITED STATES PATENT AND TRADEMARK OFFICE
CERTIFICATE OF CORRECTION

PATENT NO. : 4,395,001
DATED : July 26, 1983
INVENTOR(S) : W. James Stone et al.

It is certified that error appears in the above—identified patent and that said Letters Patent are hereby corrected as shown below:

Add, as joint inventors: Dennis M. Sorges and David A. Reeve, both of Ridgecrest, Calif.

Signed and Sealed this

Fifteenth Day of January 1985

[SEAL]

Attest:

GERALD J. MOSSINGHOFF

Attesting Officer

Commissioner of Patents and Trademarks